United States Patent
Schupp et al.

(10) Patent No.: US 9,390,106 B2
(45) Date of Patent: Jul. 12, 2016

(54) DEEP CONTEXT PHOTO SEARCHING

(71) Applicant: Sony Corporation, Tokyo (JP)

(72) Inventors: William Arthur Schupp, San Diego, CA (US); Marvin DeMerchant, San Diego, CA (US); Benjamin Roe Powers, Escondido, CA (US); Allison Marlene Chaney, San Francisco, CA (US); Hiroki Takakura, San Diego, CA (US)

(73) Assignee: Sony Corporation, Tokyo (JP)

( * ) Notice: Subject to any disclaimer, the term of this patent is extended or adjusted under 35 U.S.C. 154(b) by 232 days.

(21) Appl. No.: 14/317,284

(22) Filed: Jun. 27, 2014

(65) Prior Publication Data

US 2015/0379042 A1    Dec. 31, 2015

(51) Int. Cl.
*G06F 17/30*    (2006.01)
*G06K 9/62*    (2006.01)

(52) U.S. Cl.
CPC ............ *G06F 17/30244* (2013.01); *G06K 9/62* (2013.01)

(58) Field of Classification Search
CPC ........................... G06F 17/30; G06F 17/30244
USPC .................................................. 707/600–899
See application file for complete search history.

(56) References Cited

U.S. PATENT DOCUMENTS

2014/0282009 A1*  9/2014  Avrahami ........... G06F 3/04845
                                                            715/730

* cited by examiner

*Primary Examiner* — Isaac M Woo
(74) *Attorney, Agent, or Firm* — John L. Rogitz

(57) ABSTRACT

A user can search for photographs or videos and deep linking rules may be applied to images to discern images that might be desired by the user that otherwise would not be returned using conventional photo categorization and metadata searching.

18 Claims, 3 Drawing Sheets

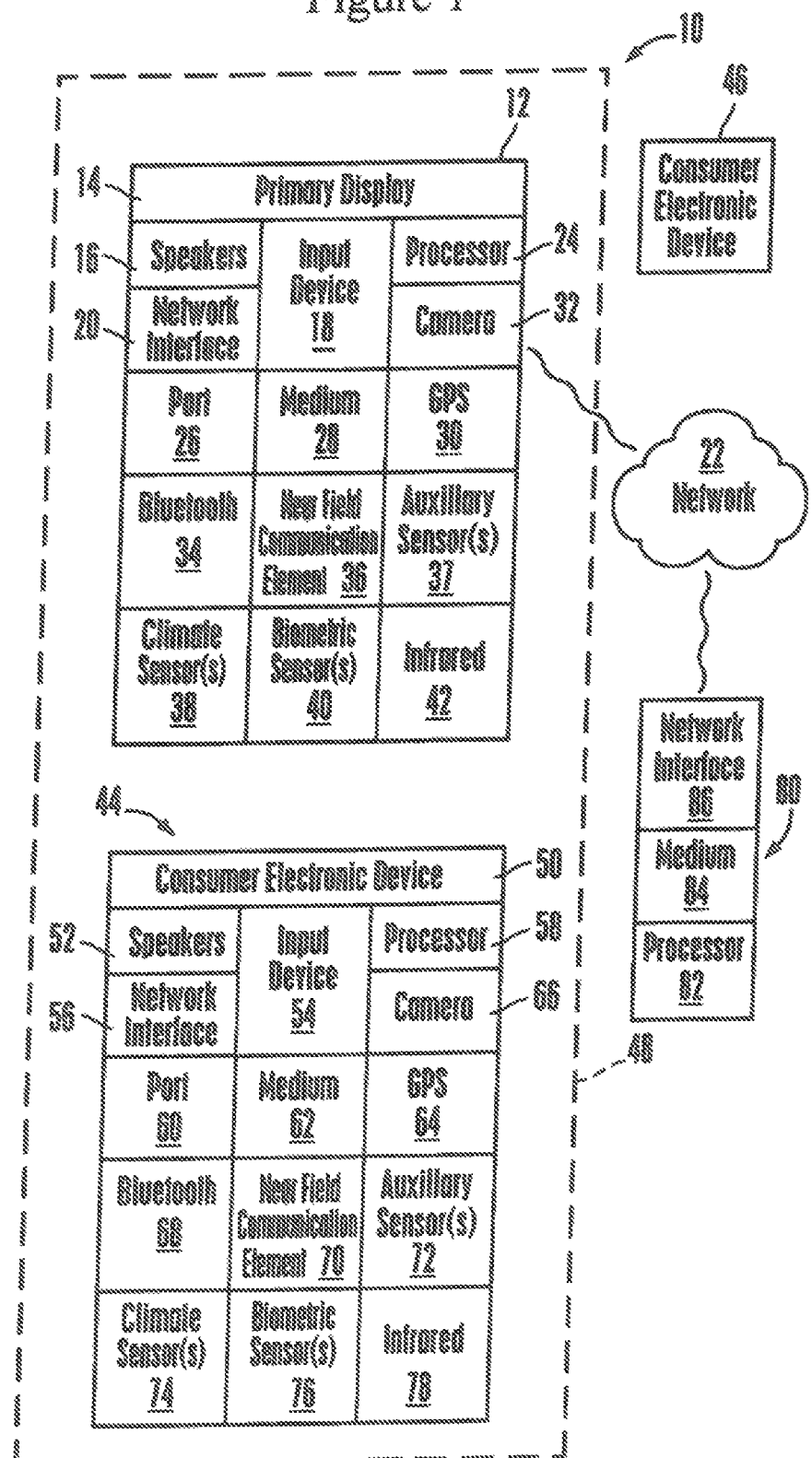

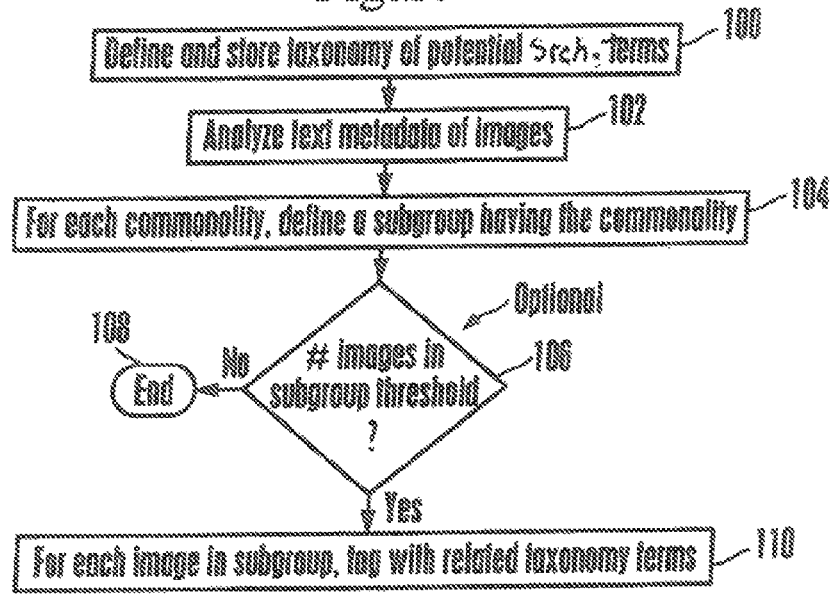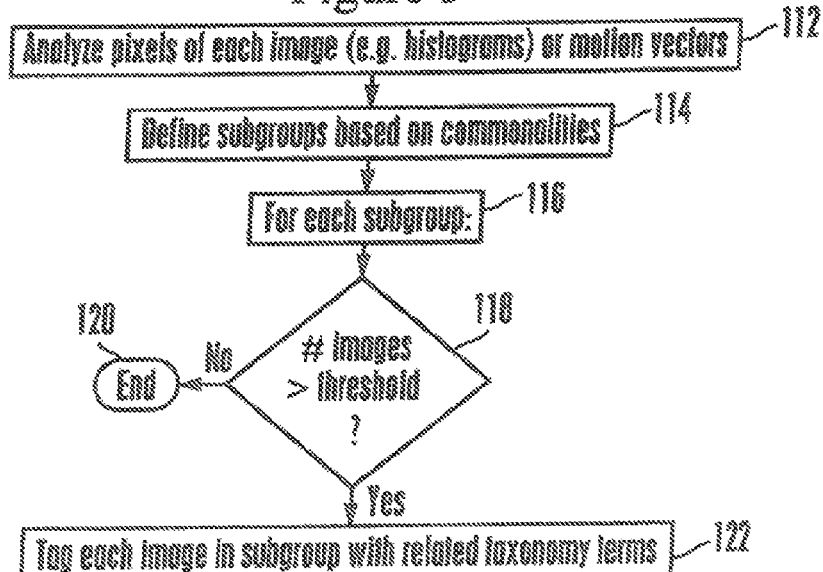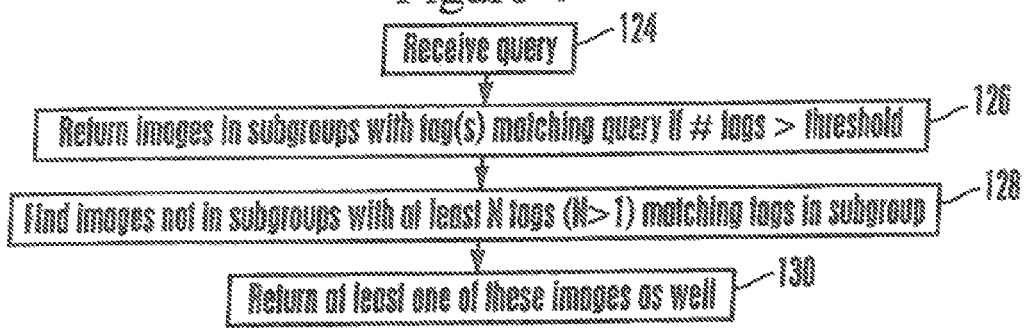

DEEP CONTEXT PHOTO SEARCHING

I. FIELD OF THE INVENTION

The application relates generally to deep context photograph searching.

II. BACKGROUND OF THE INVENTION

A computer ecosystem, or digital ecosystem, is an adaptive and distributed socio-technical system that is characterized by its sustainability, self-organization, and scalability. Inspired by environmental ecosystems, which consist of biotic and abiotic components that interact through nutrient cycles and energy flows, complete computer ecosystems consist of hardware, software, and services that in some cases may be provided by one company, such as Sony. The goal of each computer ecosystem is to provide consumers with everything that may be desired, at least in part services and/or software that may be exchanged via the Internet. Moreover, interconnectedness and sharing among elements of an ecosystem, such as applications within a computing cloud, provides consumers with increased capability to organize and access data and presents itself as the future characteristic of efficient integrative ecosystems.

Two general types of computer ecosystems exist: vertical and horizontal computer ecosystems. In the vertical approach, virtually all aspects of the ecosystem are owned and controlled by one company, and are specifically designed to seamlessly interact with one another. Horizontal ecosystems, one the other hand, integrate aspects such as hardware and software that are created by other entities into one unified ecosystem. The horizontal approach allows for greater variety of input from consumers and manufactures, increasing the capacity for novel innovations and adaptations to changing demands.

SUMMARY OF THE INVENTION

An example ecosystem that is pertinent here is an entertainment ecosystem in the home that includes a primary display, potentially controlled by a controller such as a personal computer (PC) or game console, which contains a potentially large number of digital photos that a user may wish to search. As understood herein, while users can categorize photos and on that basis search for them, there are often deeper potential links between photos that may be exploited to better return photo search results to a user.

Accordingly, a computer device includes at least one computer readable storage medium bearing instructions executable by a processor, and at least one processor configured for accessing the computer readable storage medium to execute the instructions to configure the processor for accessing at least one database containing plural image files. The instructions when executed by the processor configure the processor for, using image recognition on objects in the image files, correlating at least a first subset of the image files to at least a first aspect. The instructions when executed by the processor further configure the processor for, using metadata associated with the image files, correlating at least a second subset of the image files to at least a second aspect. The instructions when executed by the processor still further configure the processor for, responsive to a determination that the first aspect conforms to at least one user action, returning at least some of the image files in the first subset, and responsive to a determination that the second aspect matches at least one user action, returning at least some of the image files in the second subset.

The user action may be a query for images or it may not be a query at all and may be, for instance, causing an image to be presented on the display for more than a threshold period, with the image then being analyzed and matched to aspects in respective subsets to determine which subset to return as a "smart" search.

In some examples, the image files include photograph files. In some examples, the image files include video files.

In example embodiments, the first aspect is containing at least first and second recognized people. The first aspect may be containing at least a predetermined pixilation indicating a first geographic location genus. The second aspect can be at least a first common location or a first common date.

If desired, the instructions when executed by the processor configure the processor for correlating at least a first subset of the image files with each other as being related in at least a first aspect only responsive to a determination that a number of images related to each other in the first aspect exceed a threshold. Similarly, if desired, the instructions when executed by the processor configure the processor for correlating at least a second subset of the image files with each other as being related in at least a second aspect only responsive to a determination that a number of images related to each other in the second aspect exceed a threshold.

In another aspect, a computer device includes at least one computer readable storage medium bearing instructions executable by a processor, and at least one processor configured for accessing the computer readable storage medium to execute the instructions to configure the processor for accessing at least one database containing plural image files. The instructions when executed by the processor configure the processor for, using image recognition on objects in the image files, correlating at least a first subset of the image files with each other as being related in at least a first aspect, and responsive to at least one user activity on the device that is not a query for image files, returning at least some of the image files in the first subset.

In another aspect, a computer device includes at least one computer readable storage medium bearing instructions executable by a processor, and at least one processor configured for accessing the computer readable storage medium to execute the instructions to configure the processor for receiving a user query for image files. The query contains at least a first term, and the instructions when executed by the processor configure the processor for, responsive to the query, returning at least one image file associated with the first term, correlating the first term to at least a second term not contained in the query, and responsive to the query, returning at least one image file associated with the second term.

The details of the present invention, both as to its structure and operation, can be best understood in reference to the accompanying drawings, in which like reference numerals refer to like parts, and in which:

BRIEF DESCRIPTION OF THE DRAWINGS

FIG. 1 is a block diagram of an example system including an example in accordance with present principles;

FIGS. 2-4 are flow charts of example logic according to present principles;

DETAILED DESCRIPTION

Figure 5:
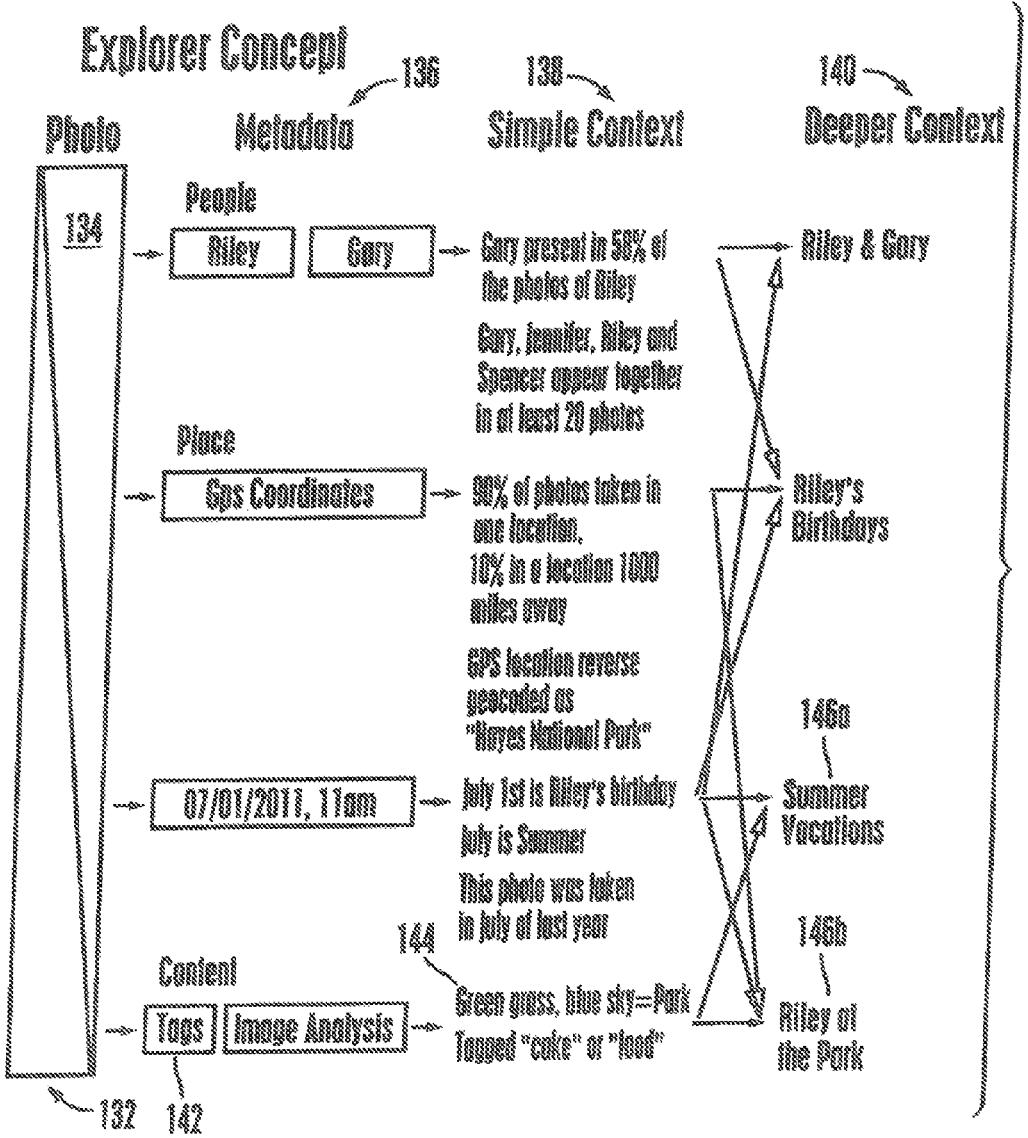
FIG. 5 is a schematic diagram illustrating examples according to present principles.

This disclosure relates generally to computer ecosystems including aspects of consumer electronics (CE) device based user information in computer ecosystems. A system herein may include server and client components, connected over a network such that data may be exchanged between the client and server components. The client components may include one or more computing devices including portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, operating systems from Microsoft, or a Unix operating system, or operating systems produced by Apple Computer or Google. These operating environments may be used to execute one or more browsing programs, such as a browser made by Microsoft or Google or Mozilla or other browser program that can access web applications hosted by the Internet servers discussed below.

Servers may include one or more processors executing instructions that configure the servers to receive and transmit data over a network such as the Internet. Or, a client and server can be connected over a local intranet or a virtual private network. A server or controller may be instantiated by a game console such as a Sony Playstation (trademarked), a personal computer, etc. Photographs and videos may be stored on any of these.

Information such as photographs and videos may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example ecosystem 10 is shown, which may include one or more of the example devices mentioned above and described further below in accordance with present principles. The first of the example devices included in the system 10 is an example primary display device, and in the embodiment shown is an audio video display device (AVDD) 12 such as but not limited to an Internet-enabled TV. Thus, the AVDD 12 alternatively may be an appliance or household item, e.g. computerized Internet enabled refrigerator, washer, or dryer. The AVDD 12 alternatively may also be a computerized Internet enabled ("smart") telephone, a tablet computer, a notebook computer, a wearable computerized device such as e.g. computerized Internet-enabled watch, a computerized Internet-enabled bracelet, other computerized Internet-enabled devices, a computerized Internet-enabled music player, computerized Internet-enabled head phones, a computerized Internet-enabled implantable device such as an implantable skin device, etc. Regardless, it is to be understood that the AVDD 12 is configured to undertake present principles (e.g. communicate with other CE devices to undertake present principles, execute the logic described herein, and perform any other functions and/or operations described herein).

Accordingly, to undertake such principles the AVDD 12 can be established by some or all of the components shown in FIG. 1. For example, the AVDD 12 can include one or more displays 14 that may be implemented by a high definition or ultra-high definition "4K" or higher flat screen and that may be touch-enabled for receiving user input signals via touches on the display. The AVDD 12 may include one or more speakers 16 for outputting audio in accordance with present principles, and at least one additional input device 18 such as e.g. an audio receiver/microphone for e.g. entering audible commands to the AVDD 12 to control the AVDD 12. The example AVDD 12 may also include one or more network interfaces 20 for communication over at least one network 22 such as the Internet, an WAN, an LAN, etc. under control of one or more processors 24. Thus, the interface 20 may be, without limitation, a Wi-Fi transceiver, which is an example of a wireless computer network interface. It is to be understood that the processor 24 controls the AVDD 12 to undertake present principles, including the other elements of the AVDD 12 described herein such as e.g. controlling the display 14 to present images thereon and receiving input therefrom. Furthermore, note the network interface 20 may be, e.g., a wired or wireless modem or router, or other appropriate interface such as, e.g., a wireless telephony transceiver, or Wi-Fi transceiver as mentioned above, etc.

In addition to the foregoing, the AVDD 12 may also include one or more input ports 26 such as, e.g., a high definition multimedia interface (HDMI) port or a USB port to physically connect (e.g. using a wired connection) to another CE device and/or a headphone port to connect headphones to the AVDD 12 for presentation of audio from the AVDD 12 to a user through the headphones. The AVDD 12 may further include one or more tangible computer readable storage medium 28 such as disk-based or solid state storage, in some cases embodied in the chassis of the AVDD as standalone devices or as a personal video recording device (PVR) or video disk player either internal or external to the chassis of the AVDD for playing back AV programs. Also in some embodiments, the AVDD 12 can include a position or location receiver such as but not limited to a cellphone receiver, GPS receiver and/or altimeter 30 that is configured to e.g. receive geographic position information from at least one satellite or cellphone tower and provide the information to the processor 24 and/or determine an altitude at which the AVDD 12 is disposed in conjunction with the processor 24. However, it is to be understood that that another suitable position receiver other than a cellphone receiver, GPS receiver and/or altimeter may be used in accordance with present principles to e.g. determine the location of the AVDD 12 in e.g. all three dimensions.

Continuing the description of the AVDD 12, in some embodiments the AVDD 12 may include one or more cameras 32 that may be, e.g., a thermal imaging camera, a digital camera such as a webcam, and/or a camera integrated into the AVDD 12 and controllable by the processor 24 to gather pictures/images and/or video in accordance with present principles. Also included on the AVDD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVDD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVDD 12 may include still other sensors such as e.g. one or more climate sensors 38 (e.g. barometers, humidity sensors, wind sensors, light sensors, temperature sensors, etc.) and/or one or more biometric sensors 40 providing input to the processor 24. In addition to the foregoing, it is noted that the AVDD 12 may also include an infrared (IR) transmitter and/or IR receiver and/or IR transceiver 42 such as an IR data association (IRDA) device. A battery (not shown) may be provided for powering the AVDD 12.

Still referring to FIG. 1, in addition to the AVDD 12, the system 10 may include one or more other CE device types. In one example, a first CE device 44 may be used to control the display via commands sent through the below-described server while a second CE device 46 may include similar components as the first CE device 44 and hence will not be discussed in detail. In the example shown, only two CE devices 44, 46 are shown, it being understood that fewer or greater devices may be used.

In the example shown, to illustrate present principles all three devices 12, 44, 46 are assumed to be members of an entertainment network in, e.g., a home, or at least to be present in proximity to each other in a location such as a house. However, for illustrating present principles the first CE device 44 is assumed to be in the same room as the AVDD 12, bounded by walls illustrated by dashed lines 48.

The example non-limiting first CE device 44 may be established by any one of the above-mentioned devices, for example, a portable wireless laptop computer or notebook computer, and accordingly may have one or more of the components described below. The second CE device 46 without limitation may be established by a video disk player such as a Blu-ray player, a game console, and the like. The first CE device 44 may be a remote control (RC) for, e.g., issuing AV play and pause commands to the AVDD 12, or it may be a more sophisticated device such as a tablet computer, a wireless telephone, etc.

Accordingly, the first CE device 44 may include one or more displays 50 that may be touch-enabled for receiving user input signals via touches on the display. The first CE device 44 may include one or more speakers 52 for outputting audio in accordance with present principles, and at least one additional input device 54 such as e.g. an audio receiver/microphone for e.g. entering audible commands to the first CE device 44 to control the device 44. The example first CE device 44 may also include one or more network interfaces 56 for communication over the network 22 under control of one or more CE device processors 58. Thus, the interface 56 may be, without limitation, a Wi-Fi transceiver, which is an example of a wireless computer network interface. It is to be understood that the processor 58 controls the first CE device 44 to undertake present principles, including the other elements of the first CE device 44 described herein such as e.g. controlling the display 50 to present images thereon and receiving input therefrom. Furthermore, note the network interface 56 may be, e.g., a wired or wireless modem or router, or other appropriate interface such as, e.g., a wireless telephony transceiver, or Wi-Fi transceiver as mentioned above, etc.

In addition to the foregoing, the first CE device 44 may also include one or more input ports 60 such as, e.g., a HDMI port or a USB port to physically connect (e.g. using a wired connection) to another CE device and/or a headphone port to connect headphones to the first CE device 44 for presentation of audio from the first CE device 44 to a user through the headphones. The first CE device 44 may further include one or more tangible computer readable storage medium 62 such as disk-based or solid state storage. Also in some embodiments, the first CE device 44 can include a position or location receiver such as but not limited to a cellphone and/or GPS receiver and/or altimeter 64 that is configured to e.g. receive geographic position information from at least one satellite and/or cell tower, using triangulation, and provide the information to the CE device processor 58 and/or determine an altitude at which the first CE device 44 is disposed in conjunction with the CE device processor 58. However, it is to be understood that that another suitable position receiver other than a cellphone and/or GPS receiver and/or altimeter may be used in accordance with present principles to e.g. determine the location of the first CE device 44 in e.g. all three dimensions.

Continuing the description of the first CE device 44, in some embodiments the first CE device 44 may include one or more cameras 66 that may be, e.g., a thermal imaging camera, a digital camera such as a webcam, and/or a camera integrated into the first CE device 44 and controllable by the CE device processor 58 to gather pictures/images and/or video in accordance with present principles. Also included on the first CE device 44 may be a Bluetooth transceiver 68 and other Near Field Communication (NFC) element 70 for communication with other devices using Bluetooth and/or NFC technology, respectively. An example NFC element can be a radio frequency identification (RFID) element.

Further still, the first CE device 44 may include one or more auxiliary sensors 72 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the CE device processor 58. The first CE device 44 may include still other sensors such as e.g. one or more climate sensors 74 (e.g. barometers, humidity sensors, wind sensors, light sensors, temperature sensors, etc.) and/or one or more biometric sensors 76 providing input to the CE device processor 58. In addition to the foregoing, it is noted that in some embodiments the first CE device 44 may also include an infrared (IR) transmitter and/or IR receiver and/or IR transceiver 42 such as an IR data association (IRDA) device. A battery (not shown) may be provided for powering the first CE device 44. The CE device 44 may communicate with the AVDD 12 through any of the above-described communication modes and related components.

The second CE device 46 may include some or all of the components shown for the CE device 44.

Now in reference to the afore-mentioned at least one server 80, it includes at least one server processor 82, at least one tangible computer readable storage medium 84 such as disk-based or solid state storage, and at least one network interface 86 that, under control of the server processor 82, allows for communication with the other devices of FIG. 1 over the network 22, and indeed may facilitate communication between servers and client devices in accordance with present principles. Note that the network interface 86 may be, e.g., a wired or wireless modem or router, Wi-Fi transceiver, or other appropriate interface such as, e.g., a wireless telephony transceiver.

Accordingly, in some embodiments the server 80 may be an Internet server, and may include and perform "cloud" functions such that the devices of the system 10 may access a "cloud" environment via the server 80 in example embodiments. Or, the server 80 may be implemented by a game console or other computer in the same room as the other devices shown in FIG. 1 or nearby.

FIGS. 2 and 3 illustrate example initialization logic conducted on the image (photo and/or video) database associated with a user of the AVDD 12. FIG. 2 illustrates that text metadata of the images is analyzed and FIG. 3 illustrates that pixel information, e.g., image recognition, histograms, motion vectors for video, and the like are analyzed.

The logic illustrated in FIG. 2 begins at block 100 with the processor 24 of the AVDD 12 executing instructions to define and store taxonomy of potential search terms. The processor 24 then analyzes text metadata of the images at block 102 by determining commonalities shared by the images. For each of the determined commonalities, a subgroup having the commonality may be defined at block 104. At this point, logic may proceed to an optional decision diamond 106 or directly to block 110. The processor may determine at decision diamond 106 whether the number of images in the subgroup reach a threshold. If the number does not reach threshold, logic ends at block 108. However, if the number of images does reach the threshold, then each image in the subgroup may be tagged with related taxonomy terms at block 110.

At block 100, taxonomy may be heuristically defined. For example, the taxonomy may associate dates in metadata with the seasons to which the dates correspond, so that images with dates in July and August, for example, are both also tagged with "summer". Position information in metadata such as global positioning satellite (GPS) data may be correlated by reverse geocoding to the name of a place, such as the name of a city or a national park. Thus, all photos with GPS location metadata located within, say, five miles of the central latitude and longitude of Los Angeles may be associated in the taxonomy with the term "Los Angeles".

Moving in reference to FIG. 3, the flow chart begins at block 112 and illustrates that pixel data of each image, e.g. histograms, or motion vectors can be analyzed. Commonalities among the pixel data or motion vectors for images may be determined by the processor 24, and subgroups may be defined based on those commonalities as in block 114. At block 116, each subgroup is considered. If the number of images is not greater than a threshold at a decision diamond 118, example logic terminates at block 120. A positive finding at decision diamond 118 that the number of images is in fact greater than a threshold may result in each image in the subgroup being tagged with related taxonomy terms at block 122.

With respect to the taxonomy based on pixel data, images with a number of green pixels satisfying a threshold may be tagged with the taxonomy term "park". Likewise, images with a number of blue pixels satisfying a threshold may be tagged with the taxonomy terms "ocean" and "beach". Video images with motion vectors indicating motion exceeding a threshold may be tagged with the taxonomy term "sporting event" and image recognition may be further applied to discern an oblong shape and in response apply the term "football" to the video. People can be recognized in photos and their names appended to the photos.

The taxonomy may include further layers. For example, using the above examples, if a user enters into the AVDD for example the birthday dates of individuals, photos within N days of a particular birthday can be tagged with the person's name and the term "birthday". Thus, for example, if John's birthday is in July, using the above example photos within N days of the birthday would be tagged with their actual metadata date, the term "summer", and the term "John's birthday". The term "summer" may be further associated in the taxonomy with the term "vacation" and so all photos with metadata dates in the summer may be tagged with both "summer" and "vacation". The taxonomy term "national park" in the example above may also be associated in the taxonomy with the term "vacation" so that photos whose GPS metadata indicate they have been taken in a national park (as obtained through, e.g., reverse geocoding of the GPS data) may be tagged with both "national park" and "vacation" as well as the proper name of the national park.

Continuing with the examples above to illustrate depths of the taxonomy used in the query responses described herein, images whose pixels indicate "park" may be further tagged with "party" or "vacation". Images whose pixels indicate "ocean" and "beach" may be tagged with the taxonomy terms "vacation", "fishing", and "surfing". Images whose motion vectors indicate "sporting event" may be tagged with the term "weekend". It is to be appreciated that the heuristically-defined taxonomy may be extended according to the principles above to additional terms and concepts.

Now referring to FIG. 4, user action such as but not limited to a query is received at block 124. Note that the user action may not be a query per se but rather allowing an image to remain presented on the display for more than a threshold period, at which point the logic infers that the user is interested in that image and thus analyzes the image along the lines described above to ascertain which aspect(s) is/are reflected in the image on display and, thus, which image subgroup(s) to prospectively return without further user request.

The processor 24 may return images in subgroups with tag(s) matching the query at block 126 if the number of tags is greater than a predetermined threshold. At block 128, the processor 24 may subsequently find images that are not in the subgroups with N≥1 tags (N being a predefined or end user-defined integer) matching the tags in the subgroup. At least one of these images is returned as well at block 130.

Query terms are used as entering arguments into an index data structure that may be constructed indexing the various tags discussed above with the image files with which each tag is associated. Images with at least N≥1 tags (N being a predefined or end user-defined integer) matching the query term(s) are returned. Moreover, the taxonomy is accessed to access additional images with tags taxonomically associated with the query term but different from the query term. In some examples, all additional images with at least one tag that is taxonomically associated with the query terms may be returned. In other examples, only the M such images (M being an integer greater than one) with the most tags taxonomically matching the query terms are returned. In still other examples K such images are selected at random and returned, K being an integer at least equal to one.

FIG. 5 represents a schematic diagram, generally labeled 132, of examples according to present principles. A photo 134 is included to demonstrate that different forms, or categories, of metadata 136 may be associated with the image. The forms of metadata 136 can include people identified by facial recognition, place and time as determined by a GPS locator, and content such as text or pixel data. Each form of metadata 136 may correlate or link to a simple context 138 shared between pictures. Taking more than one category of metadata 136 into consideration may lead to deeper context links 140 between pictures.

For example, the content metadata 142 may include tags on the photo, "cake" or "food," and can correlate to the simple context 144 that the tags indicate a cake, or food, in the picture. Pixel analysis, also part of the content metadata 142, may reveal high levels of green colors from the grass and blue colors from the sky and may thus correlate to a park setting as part of the simple context 144. Up to this point in the diagram, one category of metadata led to a simple context. Multiple categories of metadata may combine and lead to a deep context link between photos. The time metadata may combine with the content metadata 142 to lead to the deep context of summer vacations 146a. Furthermore, inclusion of place metadata may yield the deep context of Riley at the park 146b.

Figure 6:
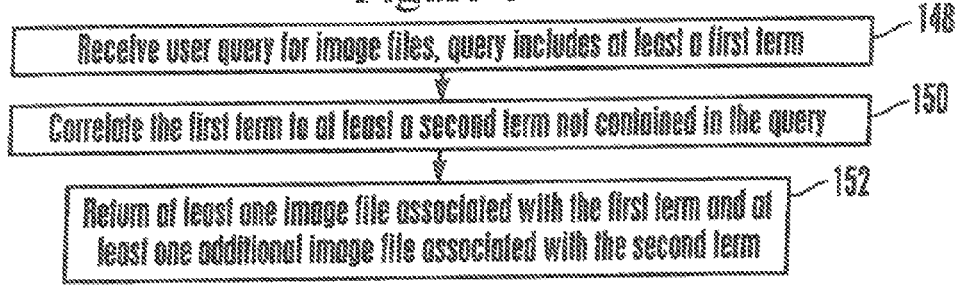
FIG. 6 is flow chart of additional example logic.

Additional example logic is illustrated in FIG. 6 and begins with the processor 24 receiving a user query for image files at block 148. The user can include in the query at least a first term, which may be correlated to a second term at block 150. The second term may not be included in the original query. The processor 24 may then at block 152 return at least one image associated with the first term contained within the query and at least one additional image associated with the second term not included in the query. This example logic builds upon the principles of returning images from search queries through a deeper context.

While the particular DEEP CONTEXT PHOTO SEARCHING is herein shown and described in detail, it is to be understood that the subject matter which is encompassed by the present invention is limited only by the claims.

What is claimed is:

1. A device comprising:
    at least one computer memory that is not a transitory signal and that comprises instructions executable by at least one processor for:
    accessing at least one database containing plural image files;
    using image recognition on objects in the image files, correlating at least a first subset of the image files to at least a first aspect only responsive to a determination that a number of images related to each other in the first aspect satisfies a threshold;
    using metadata associated with the image files, correlating at least a second subset of the image files to at least a second aspect;
    responsive to a determination that the first aspect conforms to at least one user action, returning at least some of the image files in the first subset;
    responsive to a determination that the second aspect matches at least one user action, returning at least some of the image files in the second subset.

2. The device of claim 1, comprising the at least one processor.

3. The device of claim 1, wherein the image files include video files.

4. The device of claim 1, wherein the first aspect is containing at least first and second recognized people.

5. The device of claim 1, wherein the first aspect is containing at least a predetermined pixilation indicating a first geographic location genus.

6. The device of claim 1, wherein the second aspect is at least a first common location.

7. The device of claim 1, wherein the instructions when executed by the processor configure the processor for:
    correlating at least a second subset of the image files with each other as being related in at least a second aspect only responsive to a determination that a number of images related to each other in the second aspect exceed a threshold.

8. A computer device comprising:
    at least one computer readable storage medium bearing instructions executable by a processor;
    at least one processor configured for accessing the computer readable storage medium to execute the instructions to configure the processor for:
    accessing at least one database containing plural image files;
    using image recognition on objects in the image files, correlating at least a first subset of the image files with each other as being related in at least a first aspect; and
    responsive to at least one user activity on the device that is not a query for image files, returning at least some of the image files in the first subset.

9. The device of claim 8, wherein the instructions when executed by the processor configure the processor for:
    using metadata associated with the image files, correlating at least a second subset of the image files with each other as being related in at least a second aspect;
    responsive to at least one user activity on the device that is not a query for image files, returning at least some of the image files in the second subset.

10. The device of claim 9, wherein the second aspect is at least a first common location.

11. The device of claim 9, wherein the instructions when executed by the processor configure the processor for:
    correlating at least a second subset of the image files with each other as being related in at least a second aspect only responsive to a determination that a number of images related to each other in the second aspect exceed a threshold.

12. The device of claim 8, wherein the first aspect is containing at least first and second recognized people.

13. The device of claim 8, wherein the first aspect is containing at least a predetermined pixilation indicating a first geographic location genus.

14. The device of claim 8, wherein the instructions when executed by the processor configure the processor for:
    correlating at least a first subset of the image files with each other as being related in at least a first aspect only responsive to a determination that a number of images related to each other in the first aspect exceed a threshold.

15. A computer device comprising:
    at least one computer readable storage medium bearing instructions executable by a processor;
    at least one processor configured for accessing the computer readable storage medium to execute the instructions to configure the processor for:
    receiving a user query for image files, the query containing at least a first term;
    responsive to the query, returning at least one image file associated with the first term;
    correlating the first term to at least a second term not contained in the query; and
    responsive to the query, returning at least one image file associated with the second term.

16. The device of claim 15, wherein the instructions when executed by the processor configure the processor for:
    using image recognition on objects in the image files, correlating at least a first subset of the image files with each other as being related in at least a first aspect;
    receiving a user query for image files; and
    responsive to a determination that the first aspect matches at least one query term, returning as a response to the query at least some of the image files in the first subset.

17. The device of claim 16, wherein the instructions when executed by the processor configure the processor for:
    correlating at least a first subset of the image files with each other as being related in at least a first aspect only responsive to a determination that a number of images related to each other in the first aspect exceed a threshold.

18. The device of claim 15, wherein the instructions when executed by the processor configure the processor for:
    correlating at least a second subset of the image files with each other as being related in at least a second aspect only responsive to a determination that a number of images related to each other in the second aspect exceed a threshold.

\* \* \* \* \*